United States Patent [19]

Siskin et al.

[11] Patent Number: 5,312,898
[45] Date of Patent: May 17, 1994

[54] PROCESS FOR DEPOLYMERIZATION OF POLYACRYLONITRILE USING HOT WATER

[75] Inventors: Michael Siskin, Livingston; Ramzi Y. Saleh, Flemington; George A. Knudsen, Scotch Plains, all of N.J.

[73] Assignee: Exxon Research & Engineering Co., Florham Park, N.J.

[21] Appl. No.: 812,250

[22] Filed: Dec. 20, 1991

[51] Int. Cl.$^5$ ............................................... C08F 6/00
[52] U.S. Cl. ..................................... 528/481; 528/499
[58] Field of Search ............................. 528/481, 499

[56] References Cited

U.S. PATENT DOCUMENTS

| 2,846,423 | 8/1958 | Hartmann | 260/85.5 |
| 3,083,193 | 3/1963 | Kolner | 528/481 |
| 3,416,874 | 12/1968 | Robin | 8/52 |
| 3,673,129 | 6/1972 | Sagane et al. | 528/481 |

FOREIGN PATENT DOCUMENTS 1207086 12/1965 Fed. Rep. of Germany .

OTHER PUBLICATIONS

Prince, M. et. al., "High Pressure Reactions. III. Hydrolysis of Polyacrylonitrile." J. Polymer Science: A-1, vol. 5, 161-169(1967).
European Patent Search Report for Application No. 92311505.9, Communication dated Feb. 19, 1993.
Hay, "Thermal Reactions of Polyacrylonitrile" in J. Polymer Sc., Part A-1, vol. 6, 1968, Birmingham, Engl., pp. 2127-2135.
Monahan, J. Polymer Sc., Part A-1, vol. 4, 1966, Rochester, N.Y., "Thermal Degradation of Polyacrylonitrile in the Temperature Range of 280°-450° C.", pp. 2391-2399.

*Primary Examiner*—Joseph L. Schofer
*Assistant Examiner*—Tom Weber
*Attorney, Agent, or Firm*—Linda M. Scuorzo

[57] ABSTRACT

The present invention relates to a process for depolymerizing polyacrylonitrile into water soluble by-products, including ammonia and lower molecular weight carbonaceous materials by contacting the starting materials, polyacrylonitrile, and neutral, hot liquid water at a temperature from about 200° C. up to the critical temperature of water at autogenous pressure. The present invention has utility as a means for degrading polyacrylonitrile without producing toxic hydrogen cyanide as a by-product.

5 Claims, No Drawings

PROCESS FOR DEPOLYMERIZATION OF POLYACRYLONITRILE USING HOT WATER

BACKGROUND OF THE INVENTION

1. Field of the Invention

The present invention relates to a process for decomposing polyacrylonitrile to ammonia and water soluble products by heating with liquid water as a starting material (pH of 7.0) at high temperatures.

2. Discussion of Related Art

Polyacrylonitrile resins and their copolymers ("polyacrylonitriles") find widespread use in plastics, rubber and carbon-fiber applications. A disadvantage of current thermal processes used for their depolymerization is that hydrogen cyanide is formed as a by-product of degradation. Applicants' process uses, by contrast, only neutral, hot liquid water as a starting material to decompose the polyacrylonitrile and forms ammonia as one by-product (i.e., without the potentially toxic side effects associated with the production of hydrogen cyanide).

SUMMARY OF THE INVENTION

The present invention relates to a process for degrading (i.e. depolymerizing) polyacrylonitrile using hot liquid water as a starting material by contacting the starting materials polyacrylonitrile and neutral liquid water at a temperature from about 200° C. up to the critical temperature of water, more preferably from about 200° C. to about 350° C. for from about ½ hour to about 6 hours, at the corresponding pressure generated at the particular reaction temperature at autogenous pressure, which typically for water will be from about 225.45 psi at 200° C. to about 2397.9 psi, at 350° C. depending on the temperature of the system. The process has utility as a means for depolymerizing polyacrylonitrile without the release of toxic hydrogen cyanide as a by-product.

DETAILED DESCRIPTION OF THE INVENTION

The process of the present invention is used to depolymerize polyacrylonitrile to ammonia and water soluble products that are more easily degradable and compatible with subsequent processing. The process has utility as a means for depolymerizing polyacrylonitrile without the release of toxic hydrogen cyanide as a by-product.

The polyacrylonitriles that are degraded by depolymerization in the process of the present invention may be obtained from commercial sources. The polyacrylonitriles may be obtained as finely divided particles or suspension, or in any other form that can be accommodated in the reaction vessel. It is preferred that the pieces be of sufficiently small in size to be capable of forming a suspension in the water.

In the process of the present invention, the starting materials, polyacrylonitriles and neutral liquid water (pH of 7.0) are contacted and heated at a temperature from about 200° C. to the critical temperature of water, which is about 374° C., preferably from about 200° C. to about 350° C. more preferably from about 225° C. to about 325° C. The contacting is carried out at autogenous pressure (i.e., the combined vapor pressure that is generated by the mixed components of the system at the particular reaction temperature), which typically, for liquid water alone will be from about 225.45 psi at 200° C. to about 2397.79 psi at 350° C. Pressures of liquid water at various temperatures within the above temperature range can readily be determined by one having ordinary skill in the art from standard reference texts. See, e.g., CRC Handbook of Chemistry and Physics, 61st Edition, p. D-197 (1980–1981). The contacting is carried out for a time sufficient to depolymerize the polyacrylonitrile, generally from about ½ hour to about 6 hours. The amount of depolymerization depends on the reaction time and the temperature chosen within the disclosed range. However, it is expected that more depolymerization will occur with increasing time and temperature or a combination of both. The process may be carried out using water or deoxygenated water. Applicants have found that the use of deoxygenated water can minimize undesirable side reactions. The progress of the reaction is generally evidenced by the formation of water soluble by-products, from the acrylonitrile starting material, which itself is not soluble in water under the reaction conditions of the present invention. Water soluble by-products, include ammonia and polymers containing mainly C, H, O of lower molecular weight than the starting material.

In the process of the present invention, nitrogen is removed as ammonia; that is, ammonia is produced as a by-product and is present in the aqueous phase along with the water soluble organic by-products. It is recommended that if the reaction is carried out in a sealed vessel, that periodic venting of the reaction vessel be carried out in order to drive equilibrium toward production of ammonia as the nitrogen-containing compound. The ammonia may be neutralized and/or easily separated from the water soluble organic by-products by any conventional method known to one having ordinary skill in the art.

The invention will be further understood but not limited by reference to the following examples.

EXAMPLE 1

A 0.5 g sample of polyacrylonitrile powder was added to 5 g of deoxygenated liquid water (pH equals 7.0) to form an insoluble mixture in a sealed minireactor which was then heated at 315° C. 1 hour. At the end of the time period, the mixture was cooled to room temperature. The resulting orange colored solution had a pH of 13, contained ammonia, and other by-products of the degradation (depolymerization) reaction, which were in solution.

EXAMPLE 2

The process of Example 1 was repeated at 250° C. for 2 hours producing a dark green solution having a pH of 9.5, containing ammonia and other water soluble products.

We claim:

1. A process for degrading polyacrylonitrile comprising: contacting the starting materials of polyacrylonitrile and neutral, deoxygenated water at a temperature of from about 200° C. up to the critical temperature of water at autogenous pressure for a time sufficient to depolymerize the polyacrylonitrile to produce water soluble by-products without the release of hydrogen cyanide.

2. The process of claim 1 wherein the contacting is at a temperature from about 200° C. to about 350° C.

3. The process of claim 1 wherein the contacting is at a temperature from about 225° C. to about 325° C.

4. The process of claim 1 wherein the contacting is carried out for a time from about ½ hour to about 6 hours.

5. The process of claim 1 wherein nitrogen in the polyacrylonitrile is removed as ammonia.

* * * * *